E. T. FORRESTER.
VEHICLE WHEEL.
APPLICATION FILED FEB. 1, 1913.
1,084,620.
Patented Jan. 20, 1914.
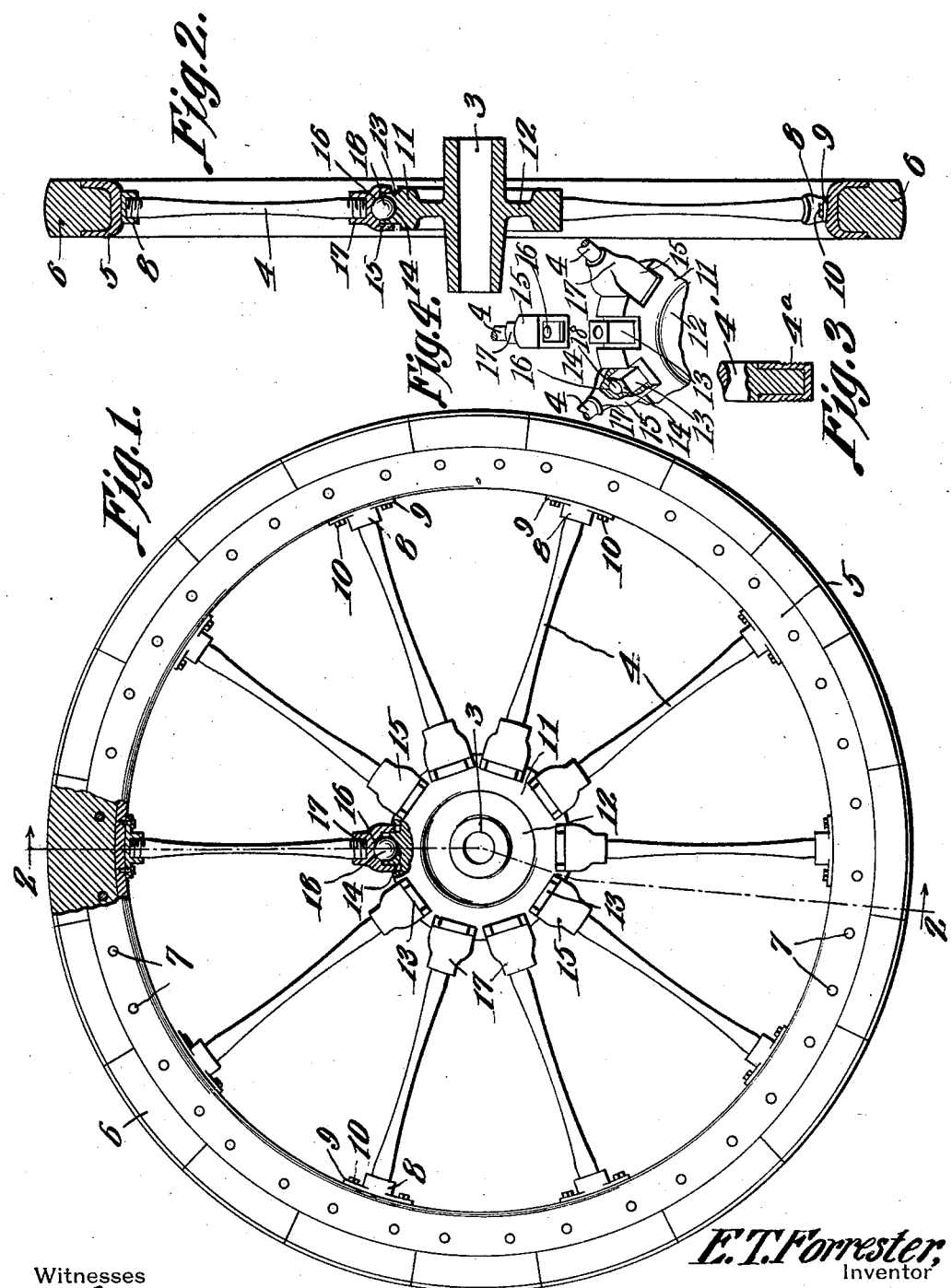
E. T. Forrester,
Inventor
Witnesses
by C. A. Snow & Co.
Attorneys

UNITED STATES PATENT OFFICE.

ELI T. FORRESTER, OF DENVER, COLORADO.

VEHICLE-WHEEL.

1,084,620.

Specification of Letters Patent. Patented Jan. 20, 1914.

Application filed February 1, 1913. Serial No. 745,756.

*To all whom it may concern:*

Be it known that I, ELI T. FORRESTER, a citizen of the United States, residing at Denver, in the county of Denver and State of Colorado, have invented a new and useful Vehicle-Wheel, of which the following is a specification.

The present invention relates to wheels for automobiles, buggies and other vehicles, and aims to provide a resilient wheel capable of supplanting the customary wheel embodying a pneumatic tire.

It is the object of the present invention to provide a resilient wheel of novel and improved construction which shall embody the desirable qualities of a wheel provided with a pneumatic tire, and at the same time eliminating the bad qualities of such wheels, and which shall embody other features and advantages.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein similar reference characters have been employed to denote corresponding parts, and wherein:—

Figure 1 is a side elevation of a vehicle wheel constructed in accordance with the present invention, parts being broken away and shown in section. Fig. 2 is a sectional view taken on the line 2—2 of Fig. 1. Fig. 3 is a fragmental detail of a modification. Fig. 4 is a fragmental perspective, illustrating one of the spokes and its cap removed from the hub structure.

Referring specifically to the drawings, the present invention embodies in its essentials, the hub 3, spokes 4 radiating therefrom and a felly 5 secured to the outer ends of the spokes. The felly 5 is preferably in the form of a continuous channel, the flanges of which project outwardly and receive the tread blocks 6. These blocks 6 are preferably constructed of wood or any other suitable material, and if wood is employed, the blocks are so cut that the grain will run radially so as to lengthen the life of the tread. The blocks are arcuate in form and as a whole provide a suitable tire for the wheel, the same facilitating traction and eliminating any undue noise especially when the wheel traverses pavements and other hard surfaces. The blocks 6 are secured or held in position by means of rivets or other securing members 7 passing through the flanges of the felly and through the blocks, or the blocks may be doweled in position.

The spokes 4 are of any suitable construction, the same being preferably fashioned from metal, or they may be fashioned from wood, in which event, ferrules or thimbles are preferably secured on the ends of the spokes. This latter construction is depicted in Fig. 3, wherein 4' represents the wooden spoke and 4ª represents the ferrule or thimble secured over the end of the spoke and threaded to retain the spoke in position as will hereinafter appear. The spokes 4 are threaded at each end, the threads at the respective ends being right and left hand.

In order to attach the outer ends of the spokes to the felly 5, a series of sockets 8 have been secured to the inner side of the felly 5, the said sockets being threaded and receiving the outer ends of the spokes. The sockets 8 are preferably provided with the ears 9, through which bolts or other securing members 10 are passed to engage or take into the felly 5.

The hub 3 may be of any suitable construction to engage the spindle of an axle, but for the purposes of this invention it is provided with an annulus or ring 11 there around and connected thereto by means of a web 12. The periphery or circumference of the annulus 11 is so fashioned as to provide a circumferential series of bosses 13 projecting radially from the ring 11, which bosses are provided with concaved seats 14. To the inner ends of the spokes there are attached the caps or cups 15, which engage or telescope over the respective bosses 13, the bosses and caps being preferably square or noncircular in order to prevent the rotation of the latter. The caps 15 are also provided with concaved seats 16 and are further provided with threaded sockets 17 projecting from their outer ends and into which the inner ends of the spokes engage. A series of resilient balls of rubber or other compressible or yielding material, designated 18, are disposed singly between the respective complementary seats 14 and 16.

In practice, the various parts of the wheel may be readily assembled, the present wheel being simple, comparatively substantial and inexpensive in construction. The spokes 4 may also be rotated in the manner of turn buckles in order to increase or decrease the compressive strain normally applied thereto. Thus, by rotating the spokes, the caps 15 may be adjusted radially to either further compress the resilient balls 18 or to relieve the said balls. The caps 15 slidably engaging or telescoping over the bosses 13 tend to maintain the hub in proper relation to the remainder of the wheel, the spokes, however, possessing the natural or ordinary degree of flexibility to assure of the perfect operation of the wheel.

As above indicated, the wooden or similar tire will facilitate traction and at the same time will eliminate any objectional noise or clatter, especially when the wheel traverses pavements or hard surfaces. The resilient balls 18 seated between the inner ends of the spokes and the hub will modify or absorb the shocks and jars to which the wheel is subjected in use, and will permit of slight vertical and oscillatory relief as the wheel is in use. It is to be understood that the slight movements of the hub in the plane of the wheel with respect to the felly is permitted by the slight flexibility of the spokes in order that the proper action of the wheel may ensue. It is intended that the said movements of the hub and felly with respect to each other should be only slight, which would be readily accommodated by the slight flexibility of the spokes. The balls, however, provide for quick recovery of the wheel after the felly and hub have been slightly displaced relative to each other.

The advantages and disadvantages of a pneumatic tire are well known in the art and need not be discussed or pointed out herein, it being noted that the present invention embodies the former and discards or eliminates the latter as much as possible.

What is claimed is:—

1. In a vehicle wheel, a felly, a hub having an annulus, the annulus being provided with a circumferential series of bosses, caps fitting slidably and non-rotatably over the bosses, resilient balls disposed between the bosses and caps, and spokes having their ends in threaded engagement with the felly and caps, the threads at the opposite ends of the spokes being right and left handed.

2. In a vehicle wheel, a felly, threaded sockets secured thereto, spokes having their outer ends threaded into the sockets, a hub having an annulus, the annulus being provided with a circumferential series of bosses having concaved seats, caps fitting slidably and non-rotatably over the bosses and having concaved seats complementing the former seats, the caps having threaded sockets receiving the inner ends of the spokes, and resilient balls disposed between the complementary seats, the threads at the opposite ends of the spokes being right and left handed.

In testimony that I claim the foregoing as my own, I have hereto affixed my signature in the presence of two witnesses.

ELI T. FORRESTER.

Witnesses:
CHARLES H. HEIGHTON,
PHILIP S. VAN CISE.